United States Patent [19]
Tirri

[11] Patent Number: 5,440,390
[45] Date of Patent: Aug. 8, 1995

[54] OPTICAL FIBER POLARIMETER

[75] Inventor: Bruce Tirri, Brookfield, Conn.

[73] Assignee: Hughes Aircraft Company, Los Angeles, Calif.

[21] Appl. No.: 77,167

[22] Filed: Jun. 14, 1993

[51] Int. Cl.⁶ ............................................. G01N 21/21
[52] U.S. Cl. .................... 356/364; 356/366; 356/367; 385/11; 385/115
[58] Field of Search ................ 356/364, 367, 366; 385/11, 115

[56] References Cited

U.S. PATENT DOCUMENTS

| | | | |
|---|---|---|---|
| Re. 34,345 | 8/1993 | Vinarub et al. | 356/384 |
| 3,788,741 | 1/1974 | Buechler | 356/371 |
| 4,589,776 | 5/1986 | Carver et al. | 356/367 |
| 4,785,171 | 11/1988 | Dowling, Jr. et al. | 356/71 |
| 5,216,483 | 6/1993 | Berthold et al. | 356/318 |

Primary Examiner—William Mintel
Assistant Examiner—Minhloan Tran
Attorney, Agent, or Firm—W. C. Schubert; W. K. Denson-Low

[57] ABSTRACT

A optical fiber polarimeter (10) includes a plurality of polarizing optical fibers (14) each having a different orientation with respect to a common reference line. A charge-coupled device having an array of pixels (32) is adapted to receive the light from the optical fibers (14) and generate a signal relating to the intensity of the light impinging on each pixel to a signal processor (18) that also orders the signals according to the orientation thereof and thereby provides a polarization phase versus intensity signal output.

16 Claims, 3 Drawing Sheets

OPTICAL FIBER POLARIMETER

BACKGROUND OF THE INVENTION

The present invention generally relates to a polarimeter and, in particular, relates to one such polarimeter having a plurality of polarizing optical fibers.

In many modern processes, such as the formation of thin films on optical substrates, for example, rugate filters, antireflection coatings and the like, the status of the process is monitored by measuring the change in light polarization. Depending on the particular application, the change in light polarization of interest can either be the change between the known polarization of an incident light beam and the polarization of a reflected light beam or the change between the known polarization of an incident light beam and the polarization of a light beam transmitted through the workpiece. Hence, by relating the change in the polarization of either the reflected or transmitted light to the parameters of the particular process, the process can be monitored.

Typically, this type of process monitoring is performed by an instrument generally known as an ellipsometer. As known in the art, conventional ellipsometers include a complex assembly of rotating polarizers, angle sensing encoders and drive motors. As the polarizers are rotated, the polarization of the light either reflected or transmitted from the workpiece is modulated. Further, such ellipsometer are so large that they must be located outside the vacuum chamber wherein the process is actually taking place. Hence, it becomes necessary to get a polarized light beam in and out of a vacuum system, which in turn introduces added complexity into both the device and analysis. Further, the use of the principles of the ellipsometer are limited due to the size and complexity of the instrument. Thus, the applications for using ellipsometers as well as the principles thereof are quite limited.

Consequently, since a change in the polarization of reflected, transmitted, or even sampled ambient light can be related to known events, it is highly desirable to provide an apparatus and technique that is more versatile than conventional polarization monitoring instruments.

SUMMARY OF THE INVENTION

Accordingly, it is one object of the present invention to provide a polarimeter that overcomes substantially all of the drawbacks discussed above of present instruments.

This object is accomplished, at least in part, by providing a polarimeter having a plurality of polarizing optical fibers.

Other objects and advantages of the present invention will become apparent to those skilled in the art from the following detailed description of the invention read in conjunction with the appended claim and the drawing attached hereto.

BRIEF DESCRIPTION OF THE DRAWINGS

The drawings; not drawn to scale, include.

DETAILED DESCRIPTION OF THE INVENTION

In order to ensure a complete understanding of the principles of the present invention, the following discussion of polarization analysis is provided. Polarization analysis is usually accomplished by measuring the periodic variation of flux transmitted by a rotating analyzer. To obtain an analytic expression for the flux variation, we examine the electric field transmitted by the rotating analyzer $$E_A(\theta) = \cos\theta \{\tan(\Psi) \cos(wt+\Delta)\}\hat{x} + \sin\theta \cos(wt)\hat{y}$$

Figure 1:
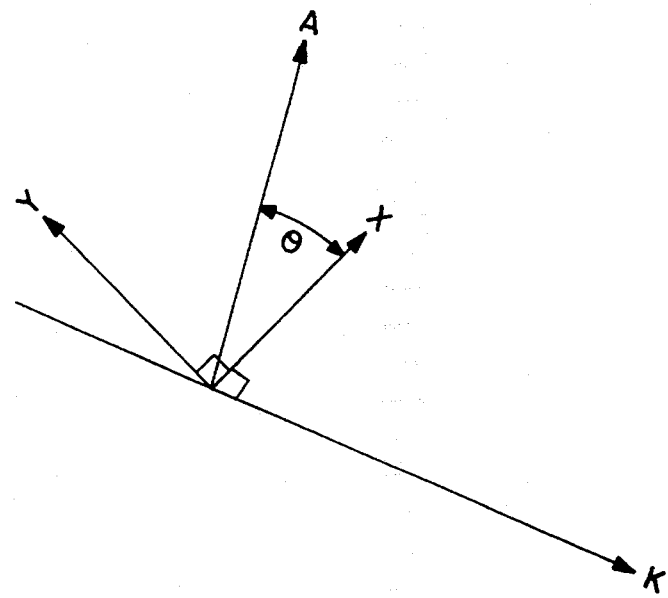
FIG. 1 which is a vector diagram of the polarized field components.

In this expression $\theta$ is the angle at one point in time between the x direction and the transmission axis of the analyzer, designated by the A direction (see FIG. 1). The components of the electric field in the x and $\hat{y}$ direction are designated $E_x$ and $E_y$ and $\tan\Psi = E_x/E_y$. The phase difference between the fields is $\Delta$. The angular frequency of the field is w.

To obtain the intensity of the field, I, that is transmitted in the A direction, we square the field and time average:

$$I(\theta) = I_o\{1 - \cos(2\Psi)\cos(2\theta) + \sin(2\Psi)\cos\Delta \sin(2\theta)\}$$

where $I_o$ is the average DC intensity. If the analyzer is rotated at a frequency $\nu = \theta/t$ the intensity detected will be modulated according to:

$$I(\nu t) = I_o\{1 - \cos\Psi \cos 2\nu t + \sin 2\Psi \cos\Delta \sin 2\nu t\}$$

We have defined the more conventional polarization parameter $\Psi = \tan(E_x/E_y)$. The modulated intensity can be measured and Fourier analyzed. From the Fourier coefficients, the polarization parameters can be obtained:

$$a2 = -\cos 2\Psi, \quad b2 = \sin 2\Psi \cos\Delta$$

A symmetric configuration also exists-whereas the rotating polarizer assembly appears in the input section of the instrument. This configuration has certain advantages in some process application. The analysis is equivalent to that presented above. This configuration is generally known as a "rotating polarizer" instrument.

The present invention makes use of polarizing optical fibers. As used herein the phrase "single polarizing optical fiber" means an optical fiber that polarizes light in a preferred orientation.

Figure 2:
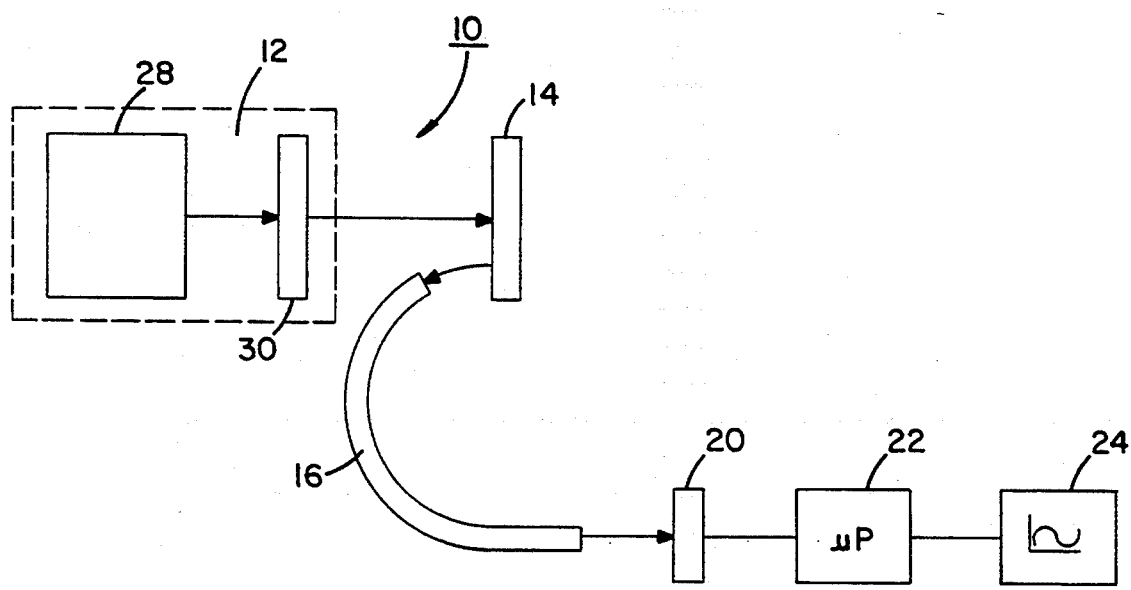
FIG. 2 which is a block diagram of a polarimeter embodying the principles of the present invention.

A polarimeter, generally indicated at 10 in FIG. 2 and embodying the principles of the present invention, includes a source of polarized light 12 that is disposed to direct a polarized light beam onto a workpiece 14 to be monitored. A bundle 16 of polarizing optical fibers 20 receives light from the workpiece 14, i.e., either light reflected from the workpiece 14 or light transmitted through the workpiece 14. In the embodiment shown in FIG. 2, the bundle 16 of optical fibers 20 is depicted as being located to receive reflected light from the workpiece 14. The polarizer 10 further includes means 20 for detecting light from the optical fibers 20 and for generating a signal in response to the intensity of the light from the optical fibers 20, means 22 for processing the signal from the detector means 20, and means 24 for displaying a processed signal from the processor means 22. Preferably, the polarimeter 10 further includes means 26, shown in FIG. 4, for ordering each of the optical fibers 18 with respect to the light detection means 20.

In the preferred embodiment, the source of polarized light 12 includes a light source 28 and an input polarizer 30. Typically, the light source 28 can be any device for generating light although a laser, a halogen lamp, or the like is preferred to ensure a source of intense light. The input polarizer 30 can be almost any conventional light beam polarizer so long as the transmission polarization exiting the polarizer is known. Hence, the input polarizer 30 is provided to ensure that the light impinging upon the workpiece 14 has a consistent polarization, or at least always has a known polarization.

Figure 3:
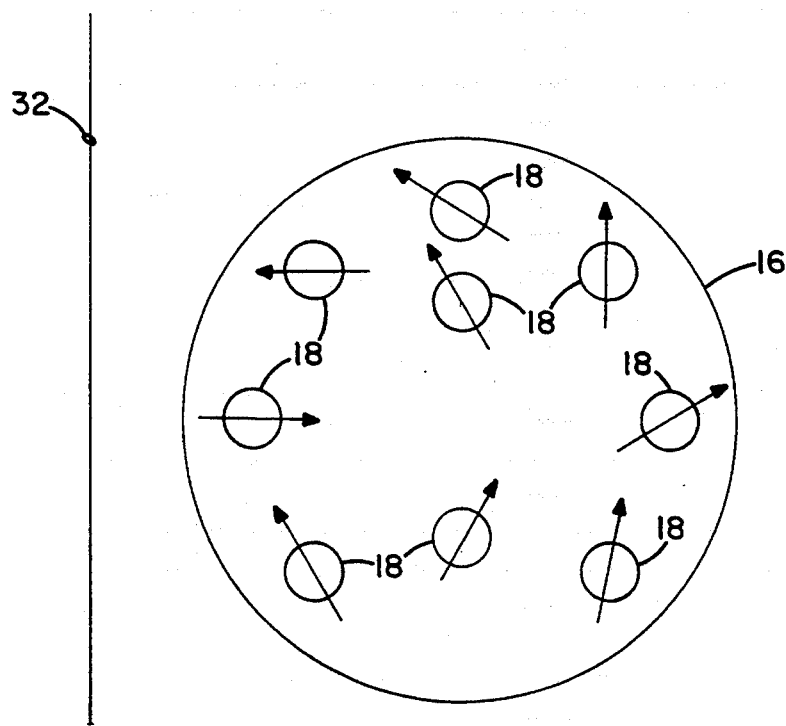
FIG. 3 which is an end view of a bundle of optical fiber particularly adapted for use in conjunction with the polarimeter shown in FIG. 2.

As shown in FIG. 3, the bundle 16 of individual optical fibers 18 are disposed such that, with respect to a common reference line 32, each fiber 18 has a different polarization orientation. Consequently, since each fiber 18 transmits only one polarization state and is oriented at a unique angle, the output of the plurality of optical fibers 14 represents the intensity of light at each polarization orientation.

Figure 6:
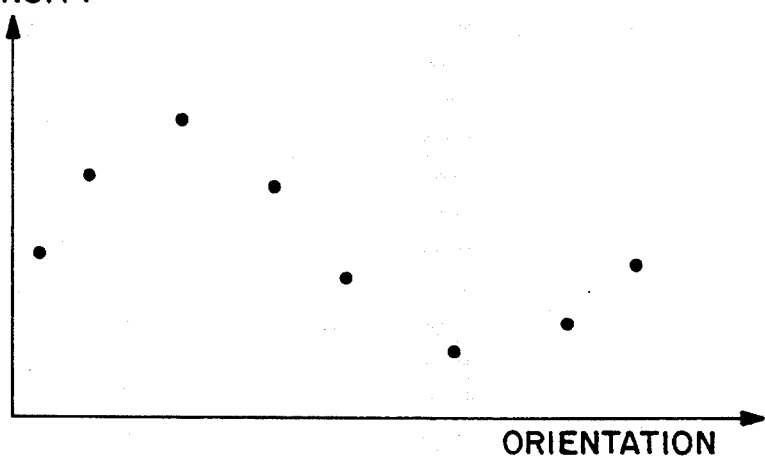
FIG. 6 is a phase versus intensity plot typical of the output of the polarimeter shown in FIG. 2 and 4.

As shown in FIG. 6, the conventional output of an ellipsometer is sinusoidal in nature wherein the X-axis is a function of the rotational frequency of the motorized polarizer (or time) and the Y-axis is a function of the intensity of the light. Thus, in order to provide an output that can be Fourier analyzed there must be at least three optical fibers 18, each having a different polarization orientation. From these three points of measurements a complete sinusoid can be constructed using conventional mathematical techniques. Naturally, the accuracy of the waveform reconstruction increases with the number of data points sampled. Hence, in the preferred embodiment, between 3 and 16 individual optical fibers 20, each having a different polarization orientation with respect to the common reference line 32 can be provided.

Figure 4:
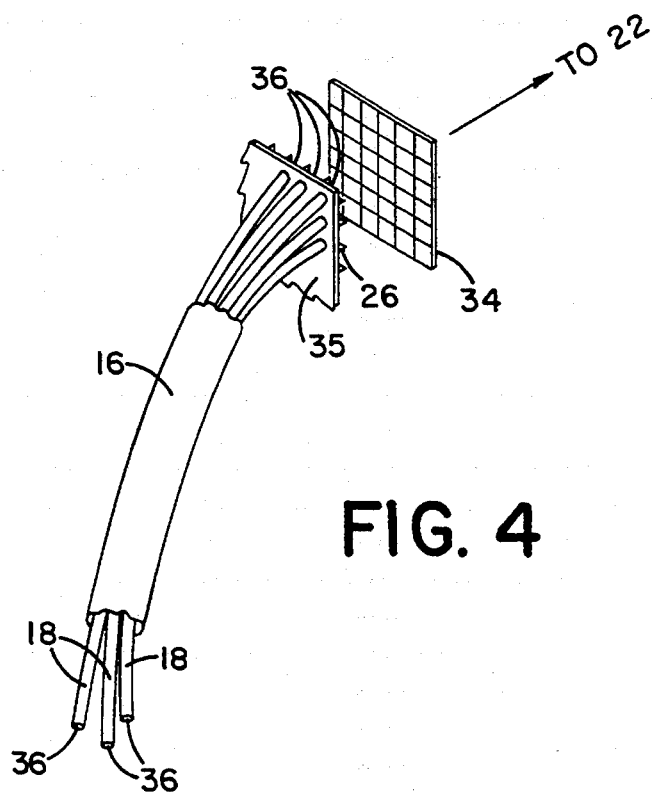
FIG. 4 which is a pictorial view of one arrangement of a bundle of optical fibers directed onto a detector array and particularly useful in conjunction with the polarimeter shown in FIG. 2.

In the embodiment shown in FIG. 2, the means 20, shown in detail in FIG. 4, for detecting light originating from the source of polarized light 12 and which is either reflected from or transmitted through the workpiece 20 is a charge-coupled device (CCD) 34 having an array of pixels as further shown in FIG. 4. As is well known in the art, each pixel of a CCD 34 outputs a signal representative of the intensity of light impinging upon that pixel. In the embodiment in FIG. 4, each of the polarizing optical fibers 18 is disposed, for example, by means of an intermediate optical fiber receiving member 35, such that the light exiting the optical fiber is directed to impinge upon either a single pixel or a preselected known group of pixels. Further, the fibers 18 are disposed in sufficient proximity to the pixels of the CCD 34 so that the light from each optical fiber 18 impinges only upon those pixels selected to receive light from that fiber 18. In addition, in the preferred embodiment, in order to optimally couple incoming light to the input end of the bundle 16 of optical fibers 18, each optical fiber 18 can be provided with a micro-optical element 36. A microlens can be fabricated on one, but preferably both ends of each fiber 18. Alternatively, gradient index lenses of appropriate size could also be used to couple light to the fibers 18 and focus light from the fibers 18 onto the CCD 34. The advantage of using the micro-optical elements 36 is an increase in the signal-to-noise ratio of the polarimeter 10. The polarizing effects of such a configuration (or any other configuration employed) requires calibration similar to that described below.

In order to maintain the ordering of the fibers 18 to particular pixels of the array 34 of the CCD, a polarized calibration beam is required. Each fiber is calibrated by first being illuminated with linearly polarized light. The polarization angle is rotated while the transmitted intensity is monitored. The angle of peak transmitted intensity corresponds to the polarization angle of the fiber.

As shown in FIG. 3, the single polarization optical fibers may be randomly ordered. Further, the individual fibers 18 do not have to be oriented in any particular pattern to the array 34 of pixels. However, it is necessary that the particular polarization orientation associated with each pixel be known. The signal processing means 22 can then be programmed to reconstruct the sinusoidal waveform in proper order.

The means 22 for processing signals from the detector means 38 can be any conventional signal processing computer, such as a conventional personal computer. Further, the means 24 for displaying a processed signal from the signal processing means 22 can be any conventional output and/or recording device. Typically, if an on-going process is being monitored, the means 24 for displaying a processed signal will include a video monitor in addition to any other signal recording device, i.e., printers, memory disks, or the like.

Figure 5:
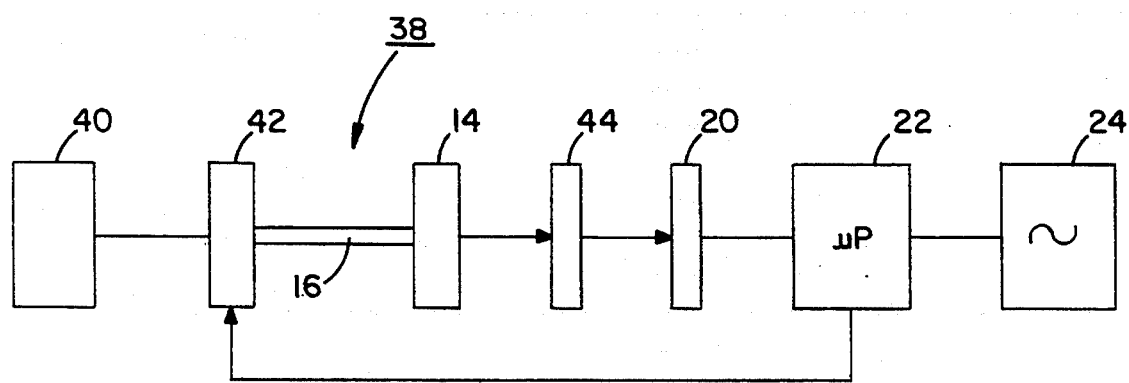
FIG. 5 which is a block diagram of another polarimeter embodying the principles of the present invention.

A polarizer, generally indicated at 38 in FIG. 5 and embodying the principles of the present invention and wherein previously discussed elements are identified with the same indicia, includes a light source 40, an optical multiplexer 42, a bundle 16 of polarizing optical fibers 18, an output polarizer 44, means 20 for detecting light, means 22 for processing the signal from the detector means 20 and means 24 for displaying a processed signal from the means 22.

In this embodiment, the light source 40 is disposed to direct a light beam into the optical multiplexer 42. The optical multiplexer 42, under the control of the means 22 for processing signals, allows light to be sequentially transmitted through the polarizing optical fibers 18. Each resultant beam interrogates the workpiece 14. The reflected or transmitted beam is then directed through the output polarizer 44 to impinge upon the detecting means 20. The signal from the detector means 20 is, as with the polarizer 10 discussed above, processed by the processing means 22 and displayed by the display means 24. The resultant display is substantially the same as that of the polarizer 10.

In operation the embodiment in FIG. 5 provides that, the light source 40 of the polarizer 20 outputs a light beam that is unpolarized. The optical multiplexer 42 selectively directs the unpolarized light into each of the fibers 18. In this embodiment, the particular polarization of each optical fiber is pre-programmed into the signal processing means 22. In addition, the processing means 22 is programmed with the transmission polarization of the output polarizer 44. Hence, when light is detected at the detecting means 20, which in this embodiment can be a single light detector element, the processing means 22 relates the intensity of the detected light to the polarization thereof.

Advantageously, the polarimeters, 10 and 20, because the bundle 16 of polarizing optical fibers can be easily disposed as desired, can be used in environments and/or locations where heretofore such measurements would either be unavailable or time consuming. For example, in the manufacture of thin films on optical substrates, the bundle 16 of polarizing optical fibers 18 can be disposed within the coating chamber. Hence, the process can be continuously monitored. Since the light sources, 28 and 40, can, if desired, be ambient light, the polarimeters, 10 and 20, can, in fact, be used to remotely monitor any environment or event that causes a change in the polarization of the ambient light. In this way, properties of a growing film or electro-optical device can be monitored such as thickness, refractive index, optical thickness and rate of growth.

Although the present invention has been described herein with respect to one or more embodiments, it will be understood that other arrangements or configuration can also be made without departing from the spirit and scope hereof. Hence, the present invention is deemed limited only be the appended claims and the reasonable interpretation thereof.

What is claimed is:

1. An optical fiber polarimeter, comprising:
    a light source, said light source for projecting a light beam onto a workpiece to provide reflected or transmitted light from said workpiece;
    a bundle of polarizing optical fibers, said bundle of polarizing optical fibers being disposed to receive said reflected or transmitted light, said polarizing optical fibers being disposed to have different polarization orientations with respect to a common reference; and
    means for detecting light from each said optical fiber and for generating a signal in response to the intensity of the light from each said optical fiber;
    said means including a charge coupled device having an array of pixels wherein each one of said pixels is associated with only one of said optical fibers.

2. The polarimeter as claimed in claim 1, wherein said light source includes a polarizer disposed in the path of said light beam such that a polarized light beam is outputted therefrom.

3. The polarimeter as claimed in claim 1 further comprising:
    an intermediate optical fiber receiving member, said intermediate optical fiber receiving member being disposed between said polarizing optical fibers and said charge-coupled device.

4. The polarimeter as claimed in claim 1, further comprising:
    means for ordering the signals from said polarizing optical fibers according to the orientation thereof.

5. The polarimeter as claimed in claim 1, further comprising:
    means for displaying said processed signal.

6. The polarimeter as claimed in claim 1 wherein each said polarizing optical fiber is provided with a lens at one end thereof.

7. The polarimeter is claimed in claim 1, wherein each said polarizing optical fiber is provided with a lens at each end thereof.

8. The polarimeter as claimed in claim 1, wherein said bundle of polarizing optical fibers includes at least three polarizing optical fibers.

9. An optical fiber polarimeter, comprising:
    a light source, said light source for projecting a light beam onto a workpiece to provide reflected or transmitted light from said workpiece;
    a bundle of polarizing optical fibers, said bundle of polarizing optical fibers being disposed to receive said reflected or transmitted light, said polarizing optical fibers being disposed to have different polarization orientations with respect to a common reference;
    means for detecting light from each said optical fiber and for generating a signal in response to the intensity of the light from each said optical fiber; and
    an optical multiplexer being disposed to receive said light beam and allow light to be sequentially transmitted through each of said polarizing optical fibers.

10. The polarimeter of claim 9 further comprising processor means for processing said generated signal and controlling said multiplexer to successively direct said light beam to each fiber in said bundle.

11. The polarimeter of claim 10, wherein said light source includes a polarizer disposed in the path of said light beam.

12. The polarimeter of claim 10, at least one fiber including a lens on at least one end of said fiber.

13. The polarimeter of claim 10 further comprising a polarizer disposed between said bundle and said detector element.

14. The polarimeter of claim 10 further comprising means for ordering the optical fibers.

15. The polarimeter of claim 10 wherein said bundle includes at least three optical fibers.

16. The polarimeter of claim 10, further comprising means for displaying processed signals.

* * * * *